United States Patent
Myers et al.

(10) Patent No.: US 7,287,651 B2
(45) Date of Patent: Oct. 30, 2007

(54) FUEL AND WATER SEPARATOR

(75) Inventors: Kevin J. Myers, Claremont, CA (US); Kenneth F. Slaughter, Claremont, CA (US); Robert R. Randle, San Dimas, CA (US)

(73) Assignees: Vortox Company, Claremont, CA (US); RCI Technologies Inc., San Dimas, CA (US)

( * ) Notice: Subject to any disclaimer, the term of this patent is extended or adjusted under 35 U.S.C. 154(b) by 0 days.

(21) Appl. No.: 11/227,275

(22) Filed: Sep. 15, 2005

(65) Prior Publication Data

US 2006/0054551 A1 Mar. 16, 2006

Related U.S. Application Data

(60) Provisional application No. 60/611,133, filed on Sep. 16, 2004.

(51) Int. Cl.
*B01D 17/025* (2006.01)
(52) U.S. Cl. .................. 210/519; 210/532.1; 210/540; 210/DIG. 5
(58) Field of Classification Search ............... 210/311, 210/519, 521, 538, 532.1, 540, DIG. 5
See application file for complete search history.

(56) References Cited

U.S. PATENT DOCUMENTS

| 3,529,728 | A | * | 9/1970 | De Jonge et al. | 210/540 |
| 3,651,944 | A | * | 3/1972 | Shuttleworth | 210/311 |
| 3,844,743 | A | * | 10/1974 | Jones | 210/DIG. 5 |
| 3,849,311 | A | * | 11/1974 | Jakubek | 210/538 |
| 4,123,365 | A | * | 10/1978 | Middelbeek | 210/540 |
| 4,132,652 | A | * | 1/1979 | Anderson et al. | 210/521 |
| 4,257,895 | A | * | 3/1981 | Murdock | 210/532.1 |
| 4,722,800 | A | * | 2/1988 | Aymong | 210/519 |
| 4,802,978 | A | * | 2/1989 | Schmit et al. | 210/540 |
| 5,286,383 | A | * | 2/1994 | Verret et al. | 210/540 |

* cited by examiner

*Primary Examiner*—Christopher Upton
(74) *Attorney, Agent, or Firm*—Boniard I. Brown

(57) ABSTRACT

A fuel-water separator for diesel engines has a coalescing media and baffle plates through which diesel fuel and water pass upwardly, separation thereof being effected by reducing emulsification of water with fuel, and by passing of heavy particulates to the bottom of the separator.

17 Claims, 2 Drawing Sheets

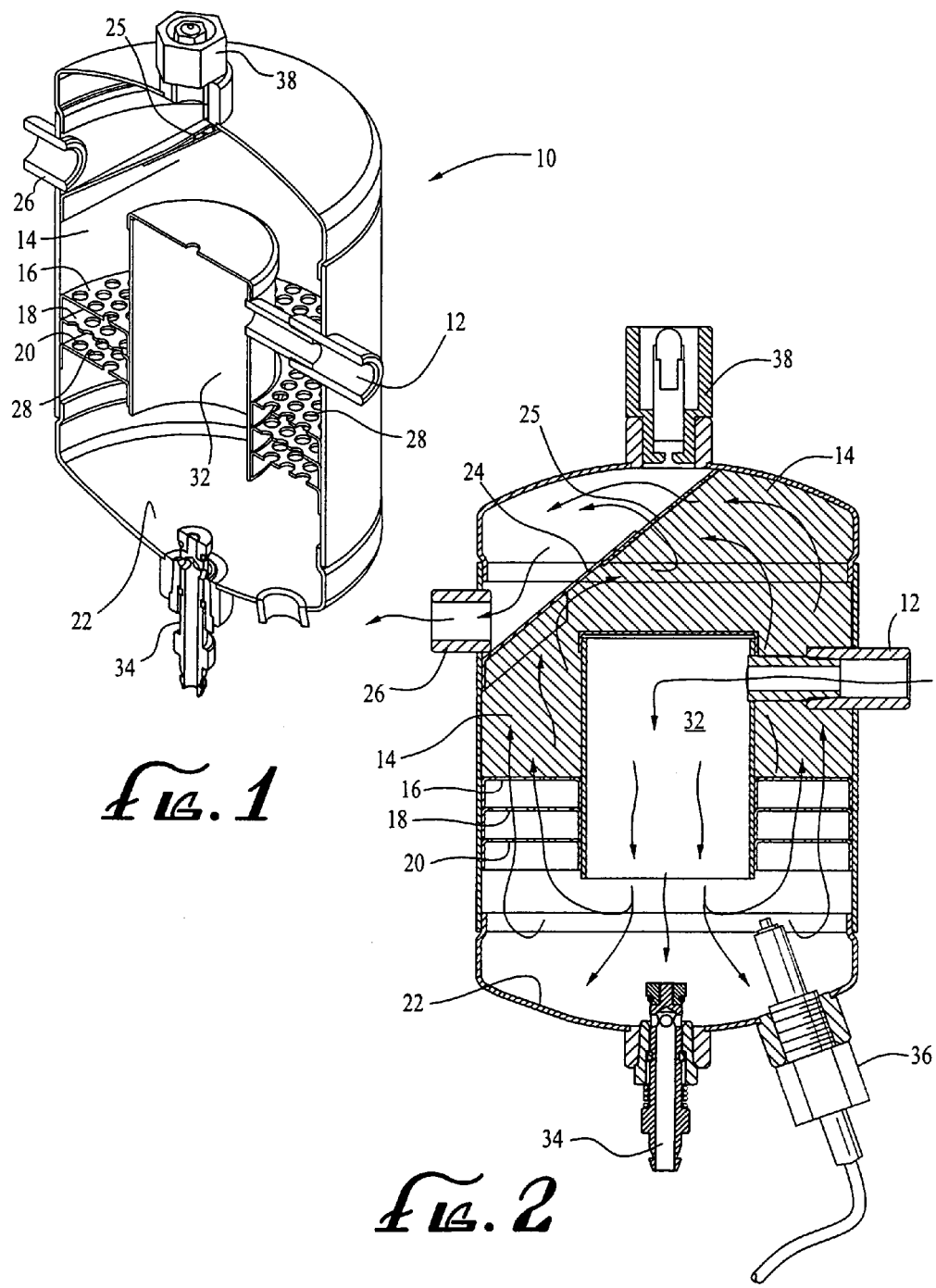

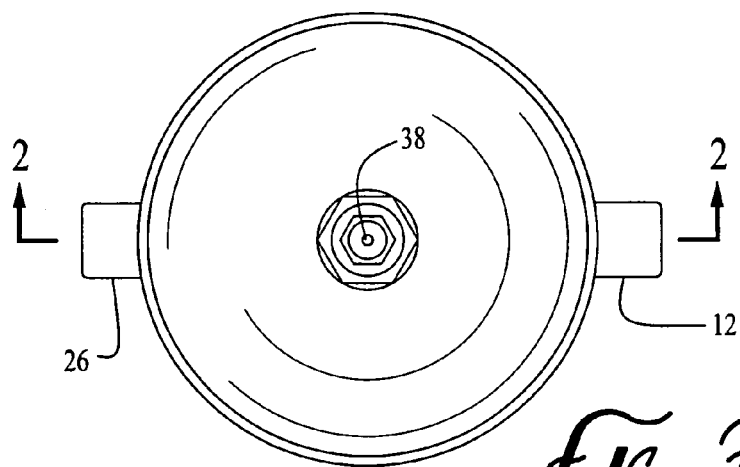
FIG. 3
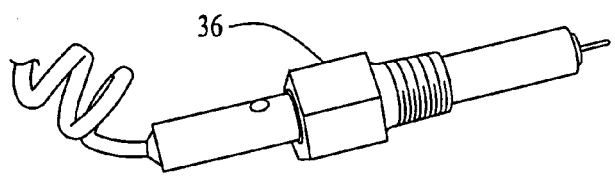
FIG. 4
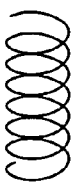
FIG. 5A
FIG. 5B
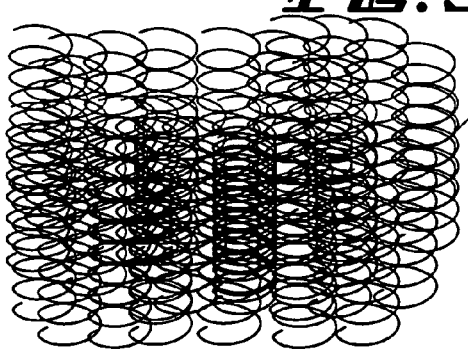
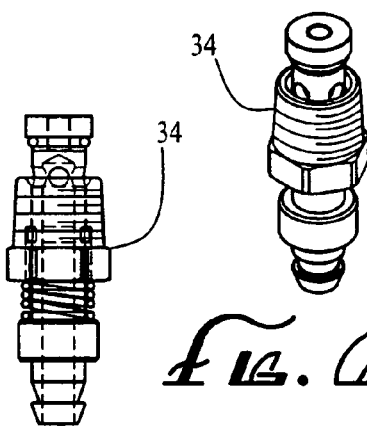
FIG. 6A
FIG. 6B

FUEL AND WATER SEPARATOR

RELATED APPLICATIONS

Reference is made to our Provisional Application No. 60/611,133 filed Sep. 16, 2004, entitled Fuel and Water Separator.

BACKGROUND AND SUMMARY OF THE INVENTION

The present invention relates to a fuel-water separator for diesel engines, comprising coalescing media and a plurality of baffle plates.

Diesel fuel and water mixture enter the separator and pass upwardly through the baffle plates and the coalescing media. Separated heavier water droplets drop to the bottom of the separator. Smaller droplets are carried with fuel and pass upwardly through the separator. Separation of water and fuel is effected by minimizing emulsification of water with fuel, and separation is further effected by the heavy particulates passing with large droplets to the bottom of the separator. Large water deposits in fuel are removed.

Coarse water droplets are removed from the fuel as well as impurities having specific gravities heavier than diesel fuel.

The invention greatly extends filter life and greatly reduces down-time, costs of filters and the time and labor involved in changing filters. Filter service life is extended four to six times by utilizing filters according to the invention.

The separator of the invention comprises coalescing media disposed in a generally upper portion of a housing and retained by an inclined wall plate and screen portion thereof, a plurality of baffle plates define a plurality of openings, a fuel and water mixture enters the separator via said inlet passage to pass generally upwardly through said baffle plates and said coalescing media to separate from the fuel by coalescence, droplets being generally carried in the flow stream with sufficient velocity, Water droplets become attached to the coalescing media to form heavier droplets which have overcome the flow rate of the fuel mixture, and are dropped toward the bottom of the separator.

Separation of water from fuel is effected by the lowering of the fuel flow rate to reduce emulsification of water with fuel, said flow passing generally upwardly via the inclined screen and passing from the separator via an outlet passage. Separation is further effected by heavy particulates of substantial specific gravity passing to the bottom of the separator with large droplets.

BRIEF DESCRIPTION OF THE DRAWINGS

FIG. 1 is a perspective sectional cut-away view of a separator according to the present invention;

FIG. 2 is a sectional view taken at line 2-2 in FIG. 3;

FIG. 3 is a top view of the separator of FIGS. 1 and 2;

FIG. 4 is a perspective view of a heater device utilized with the invention;

FIGS. 5A and 5B are perspective views of metallic spring-like elements utilized as coalescing media with the invention; and FIGS. 6A and 6B are elevational and perspective views of a drain port device utilized with the invention.

DESCRIPTION OF A PREFERRED EMBODIMENT OF THE INVENTION

Referring to the drawings, a preferred embodiment of the fuel-water separator of the invention 10 comprises an upper inlet member 12, an inner chamber containing coalescing media 14 or otherwise called a "wad" comprising a plurality of mass of spring-configurated elements, typically metal, compressed together.

The separator of the invention is interconnected between a diesel fuel supply (not shown) and a primary filter (not shown) of the engine intake. The apparatus of the invention may be provided in various sizes depending on flow rates to be provided, particular engines with which utilized, etc.

Mounted within the outer housing are three baffle plates 16, 18, 20 having a plurality of openings or passages 28 therein, the openings in the respective plates being staggered for a purpose hereinafter described.

The outer housing of the separator has a bottom wall 22 and an upper inlet member 12. An inclined plate 24 is mounted in the orientation shown in FIG. 2. Extending therefrom is a similarly oriented screen member 25. The inlet passage member 12 is disposed opposite from an outlet member 26 and is disposed in a lower position relative thereto.

A conventional drain port mechanism 34 is mounted in the bottom opening in bottom wall 22 of the separator for emptying the contents of the separator. A conventional heater 36 is mounted in the bottom wall 22 for use in preventing gelling and the formation of ice crystals of liquid in the separator. A conventional purge valve device 38 is mounted in an upper opening of the separator, as shown in FIG. 2, and is utilized to evacuate air contained within the contents of the separator, typically after the initial input of oil-water mixture for processing by the separator.

The flow of fuel, typically diesel fuel with water therein, after entering the separator via inlet 12 passes generally downwardly through a large tubular member 32, then the flow turns in the opposite direction, as shown by the arrows in FIG. 2, and upwardly through the openings in baffle plates 16, 18, 20, and thence generally upwardly, as shown by the directional arrows, through the coalescing media or wad 14. The flow then passes through the screen 25 and outwardly of the separator via the outlet member or passage 26.

The velocity of the fuel is substantially slowed in proportion to and in accordance with a substantial increase of the cross-sectional area through which the fuel passes in proportion to the cross-sectional area of the inlet and the vertical housing of the separator. The fuel velocity causes droplets suspended in the fuel to maintain their mass and not emulsify with the fuel. The separation of water from the fuel is accomplished by lowering the fuel flow rate, thus eliminating emulsification of water into the fuel.

Relatively smaller water droplets, which are not sufficiently heavy to drop from the fuel flow stream, are carried with the fuel as the fuel passes or transitions generally vertically upwardly via the three perforated baffle plates 16, 18, 20, which serve as a primary barrier to trap large particulate matter which may be present in the fuel stream, and to attract water droplets which may attach by coalescence to the edges of the perforated holes. Holes 28 in the respective perforated plates 16, 18, 20 are offset or staggered, as between plates, to prevent laminar flow and provide a tortuous flow path.

Heavy particulates of greater specific gravity than the fuel, fall to the bottom of the separator with larger droplets of water. Smaller water droplets, not heavy enough to drop from the fuel stream, are carried with the fuel as it passes vertically upwardly through the three perforated baffle plates 16, 18, 20, which are primary barriers to trap large particulate matter in the fuel stream, and to attract water droplets to be attached to edges of perforated holes in the baffle plates.

The stream then enters the coalescing media or wad 14 which comprises a plurality or mass of metallic springs compressed together. The fuel passes or travels through the coalescing media, thus to allow water in the fuel to attach to the wad and separate from the fuel by coalescence. The specific gravities of diesel fuel and water are quite similar, so that with sufficient fuel velocity and with sufficiently small sized water droplets, the droplets are generally carried in the flow stream.

As droplets of water become attached to the wad, additional droplets attach thereto to form larger droplets. As droplets become larger and heavier, they overcome the flow rate of the fuel and drop to the base of the separator. The reduced fuel flow rate also causes large water droplets to drop to the base of the separator.

It is desired that the liquid stream be maintained in the wad for a maximum duration. The longer the liquid stream is disposed in the coalescing media, the greater adherence of water molecules to each other. As they become larger, and the greater their specific gravity, the larger size water drops fall downwardly in the separator. Water in the fuel attaches to the wad and thus collects and separates water from the fuel by coalescence.

The separation of water from fuel is thus accomplished by the lowering of the fuel flow rate or velocity, thus to limit the emulsification of water into the fuel. Water separation is achieved in accordance with the following principles and features: the specific gravity of water is higher than that of diesel fuel; the maintaining of water droplet sizes as large as feasible; accumulating water droplets coalescing in the wad; maximizing the time duration of fuel in the wad; and the immediate separation of large water droplets at the low point of velocity.

Thus there has been shown and described a novel fuel and water separator which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The invention claimed is:

1. A fuel and water separator comprising:
   an outer housing having an inlet passage,
   coalescing media disposed in a generally upper portion of the housing and retained therein by an inclined wall plate having an inclined screen portion extending thereof,
   at least one baffle plate defining a plurality of openings,
   a fuel and water mixture entering the separator via said inlet passage to pass generally upwardly through said at least one baffle plate and said coalescing media forming means to separate from the fuel by coalescence droplets generally carried in the flow stream with sufficient velocity, such that
   water droplets becoming attached to the coalescing media to form heavier droplets which have overcome the flow rate of the fuel mixture, and which are dropped toward the bottom of the separator,
   separation of water from fuel being effected by the lowering of the fuel flow rate to reduce emulsification of water with fuel,
   said flow passing generally upwardly via said inclined wall plate and screen portion and passing from the separator via an outlet passage, and
   separation being further effected by heavy particulates of substantial specific gravity passing to the bottom of the separator with droplets, while smaller water droplets too light to fall to the bottom of the separator are carried with the fuel and pass generally vertically upwardly via the baffle plates which act as primary barriers to trap particulate matter.

2. A separator according to claim 1 wherein a liquid stream is maintained in the coalescing media for an optimum duration.

3. A separator according to claim 1 wherein said inlet passage is in a side wall portion of the housing.

4. A separator according to claim 1 wherein said baffle plates are disposed below said coalescing media.

5. A separator according to claim 1 wherein a generally tubular central member receives the incoming mixture and guides movement thereof downwardly.

6. A fuel and water separator comprising:
   an outer housing having an inlet passage,
   coalescing media disposed in a generally upper portion of the housing and retained by an inclined wall plate having an inclined screen portion extending thereof,
   a plurality of baffle plates defining a plurality of openings,
   a fuel said inlet passage being arranged such that and water mixture enters the separator generally horizontally via the inlet passage and drops downwardly, then passes generally upwardly through said baffle plates and said coalescing media forming means to separate from the fuel by coalescence, such that
   water droplets becoming attached to the coalescing media to form heavier droplets which have overcome the flow rate of the fuel mixture, are dropped toward the bottom of the separator,
   separation of water from fuel being effected by the lowering of the fuel flow rate to reduce emulsification of water with fuel,
   said flow passes generally upwardly via the inclined screen and passes from the separator via an outlet passage, and
   separation is further effected by heavy particulates of substantial specific gravity passing to the bottom of the separator with large droplets, while smaller water droplets too light to fall to the bottom of the separator are carried with the fuel and pass generally vertically upwardly via the baffle plates which act as primary barriers to trap larger particulate matter.

7. A separator according to claim 6 wherein a liquid stream is maintained in the coalescing media for an optimum duration.

8. A separator according to claim 6 wherein said fuel and water mixture enters the separator and drops vertically via a tubular member.

9. A separator according to claim 6 wherein said inlet passage is in a side wall portion of the housing.

10. A separator according to claim 6 wherein said baffle plates are disposed below said coalescing media.

11. A separator according to claim 6 wherein a generally tubular central member receives the incoming mixture and guides movement thereof downwardly.

12. A fuel and water separator comprising:

an outer housing having an inlet passage, coalescing media disposed in a generally upper portion of the housing and retained by an inclined wall plate having an inclined screen portion extending thereof, a plurality of baffle plates defining a plurality of openings, a fuel and water mixture enters the separator via said inlet passage to pass generally upwardly through said baffle plates and said coalescing media forming means to separate from the fuel by coalescence, droplets being generally carried in the flow stream with sufficient velocity, such that water droplets accumulate and become attached to the coalescing media to form larger droplets which overcome the flow rate of the fuel-water mixture, and drop toward the bottom of the separator, the specific gravity of water being greater than that of diesel fuel, water droplets are maintained as large as feasible for water droplets to coalesce and to maximize the time duration of fuel in the coalescing media, separation of water from fuel being effected by the lowering of the fuel flow rate to reduce emulsification of water with fuel, said flow passes generally upwardly via the inclined screen and passes from the separator via an outlet passage, and separation is further effected by heavy particulates of substantial specific gravity passing to the bottom of the separator with large droplets, while smaller water droplets too light to fall to the bottom of the separator are carried with the fuel and pass generally vertically upwardly via the baffle plates which act as primary barriers to trap larger particulate matter.

13. A separator according to claim 12 wherein a liquid stream is maintained in the coalescing media for an optimum duration.

14. A separator according to claim 12 wherein said fuel and water mixture enters the separator and drops vertically via a tubular member.

15. A separator according to claim 12 wherein said inlet passage is in a side wall portion of the housing.

16. A separator according to claim 12 wherein said baffle plates are disposed below said coalescing media.

17. A separator according to claim 12 wherein a generally tubular central member receives the incoming mixture and guides movement thereof downwardly.

* * * * *

UNITED STATES PATENT AND TRADEMARK OFFICE
CERTIFICATE OF CORRECTION

PATENT NO. : 7,287,651 B2  Page 1 of 1
APPLICATION NO. : 11/227275
DATED : October 30, 2007
INVENTOR(S) : Kevin J. Myers et al.

It is certified that error appears in the above-identified patent and that said Letters Patent is hereby corrected as shown below:

Column 4, line 15, before "wherein" insert -- providing means --;

Column 4, line 33, before "said" delete "a fuel"; after "such that" insert -- a fuel --;

Column 4, line 57, before "wherein" insert -- providing means --;

Column 6, line 11, before "wherein" insert -- providing means --.

Signed and Sealed this

Twenty-third Day of September, 2008

JON W. DUDAS
*Director of the United States Patent and Trademark Office*